United States Patent [19]
Jacobsen, Jr. et al.

[11] Patent Number: 5,484,501
[45] Date of Patent: Jan. 16, 1996

[54] METHOD OF MANUFACTURING AN IMPROVED WOOD FIBER MAT FOR SOIL APPLICATIONS

[75] Inventors: William M. W. Jacobsen, Jr., Hickory, N.C.; L. Carl Belt, Lebanon; Ernest De Pass, Bound Brook, both of N.J.

[73] Assignee: Conwed Fibers, a division of Leucadia, Inc., New York, N.Y.

[21] Appl. No.: 265,458

[22] Filed: Jun. 24, 1994

Related U.S. Application Data

[63] Continuation of Ser. No. 947,946, Sep. 18, 1992, Pat. No. 5,330,828, which is a continuation of Ser. No. 638,497, Jan. 7, 1991, abandoned.

[51] Int. Cl.$^6$ ................ B31D 5/00; B29C 59/04
[52] U.S. Cl. ............. 156/209; 156/296; 156/626; 264/121; 264/122; 264/128; 162/117; 162/284
[58] Field of Search ............... 156/62.2, 62.6, 156/209, 296, 209, 296; 264/121, 122, 128; 162/117

[56] References Cited

U.S. PATENT DOCUMENTS

| | | | |
|---|---|---|---|
| 2,757,150 | 7/1956 | Heritage | 523/326 |
| 3,010,161 | 11/1961 | Duvall | 261/116 |
| 3,308,218 | 3/1967 | Wiegand et al. | 264/121 |
| 3,577,312 | 5/1971 | Videen et al. | 162/148 |
| 4,100,324 | 7/1978 | Anderson | 428/288 |
| 4,265,954 | 5/1981 | Romanek | 428/85 |
| 4,353,946 | 10/1982 | Bowers | 428/109 |
| 4,580,960 | 4/1986 | Apman et al. | 425/81.1 |
| 4,635,576 | 1/1987 | Bowers | 428/233 |
| 4,786,550 | 11/1988 | McFarland | 428/203 |
| 4,886,697 | 12/1989 | Perdelwitz | 428/192 |
| 5,178,939 | 1/1993 | Caldwell | 428/296 |

*Primary Examiner*—Patrick J. Ryan
*Assistant Examiner*—Richard C. Weisberger
*Attorney, Agent, or Firm*—Vidas, Arrett & Steinkraus

[57] ABSTRACT

Improved wood fiber mat comprised of a mixture of thermomechanically processed wood fibers and synthetic fibers.

9 Claims, 4 Drawing Sheets

5,484,501

METHOD OF MANUFACTURING AN IMPROVED WOOD FIBER MAT FOR SOIL APPLICATIONS

This application is a continuation of Ser. No. 07/947,946 filed Sep. 18, 1992, now U.S. Pat. No. 5,330,828 which in turn is a continuation of Ser. No. 07/638,497 filed Jan. 7, 1991, now abandoned.

BACKGROUND OF THE INVENTION

1. Field of the Invention

This invention relates to a wood fiber mat which can be used as an erosion control device, and more particularly to a wood fiber mat composed of a thermally bonded mixture of thermo-mechanically processed wood fibers and synthetic fibers, which provides improved absorption of water, better handling, and allows the mat to conform better to the terrain.

2. Description of the Related Art

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

U.S. Pat. No. 3,577,312 (Expired), entitled "Felted Fibrous Web or Batt", issued May 4, 1971, now owned by Leucadia, Inc., discloses a mat formation process used to form the wood fiber substrate into the inventive mat prior to thermobonding.

U.S. Pat. No. 3,010,161 (Expired), entitled "Method And Means For Producing Mixed Fiber Suspensions", issued Nov. 28, 1961, now owned by Leucadia, Inc., is cited in U.S. Pat. No. 3,577,312 as a method of producing fibrous webs using air suspension.

U.S. Pat. No. 2,757,150 (Expired), entitled "Preparing Hot-Moldable Thermosetting Resin and Cellulose Fiber Mixtures", issued Jul. 31, 1956, discloses the process used to produce wood fibers using "thermo-mechanical" defibration.

U.S. Pat. No. 3,308,218 (Expired), entitled "Method For Producing Bonded Fibrous Products", issued Mar. 7, 1967, owned by Leucadia, Inc. was cited in U.S. Pat. No. 3,577,312.

U.S. Pat. No. 4,353,946, entitled "Erosion Control Means", issued Oct. 12, 1982 to Seasonmakers Limited of Australia, discloses a shredded wood wool fibre mat which is retained in a coherent structure using a biodegradable plastic mesh.

U.S. Pat. No. 4,635,576, entitled "Stitched Woodwool Mat", issued Jan. 13, 1987 to Seasonmakers Limited, discloses a mat made with woodwool fibres that is reinforced using longitudinally rows of chain stitches.

U.S. Pat. No. 4,580,960, entitled "Apparatus For Making Laminated Lignocellulose Fiber Mats", issued Apr. 8, 1986 to Fiber Search Partnership, now owned by Pacific Wood Fibers, discloses a mat product applied over soil to provide a favorable growth medium for seeds or seedlings.

SUMMARY OF THE INVENTION

The subject invention may be used in a variety of applications involving drainage and erosion control. In the preferred embodiment, the inventive improved mat is used to provide erosion control and mulching properties on construction sites. In practice, a denuded area is graded, seeded and fertilized. The inventive mat is unrolled over the area. The grass seed germinates on the soil surface and emerges through the mat. The organic portion of the mat biodegrades while the thermoplastic portion of the mat photodegrades.

By utilizing a combination of thermo-mechanically processed wood fibers and thermoplastic fibers, such as polypropylene or polyethylene fibers, applicants have found that a mat can be produced which shows markedly superior performance in absorbing and retaining water to that of mats supplied by others. The wool fibers allow the mat product to absorb water and conform to the terrain, while the thermoplastic fibers increase the handability of the mat product. Testing has shown that applicants' mat outperforms mats supplied by others by a factor of from 4 to 73 times in decreasing the rate of soil erosion and reducing the water flow rate.

Using this combination of fibers provides a mat which exhibits greater uniformity in terms of thickness, tensile strength and density. This mat also absorbs and retains more water than prior art mats. This mat also conforms better to the terrain, allowing the mat to make intimate contact with the soil, thereby better minimizing soil erosion and loss of seed bed.

DESCRIPTION OF THE PREFERRED EMBODIMENTS

Figure 1:
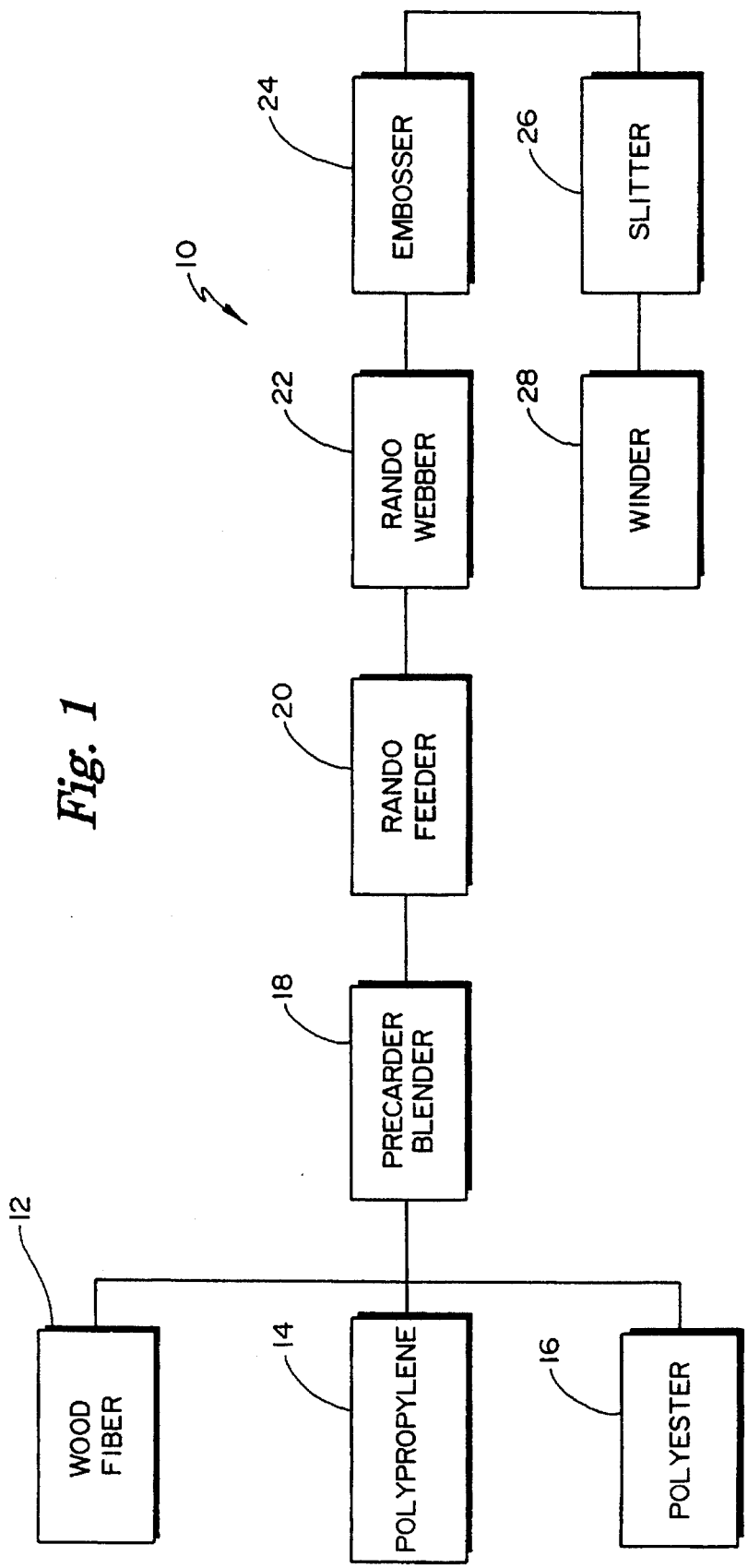
FIG. 1 is a schematic of the line used to produce the inventive mat.

While this invention may be embodied in many different forms, there are shown in the drawings and described in detail herein specific preferred embodiments of the invention. The present disclosure is an exemplification of the principles of the invention and is not intended to limit the invention to the particular embodiments illustrated.

The inventive mat is made of a combination of thermo-mechanically processed wood fibers and a synthetic fiber such as polypropylene or polyethylene, although polypropylene is preferred. A mixture of two or more types of thermoplastic synthetic fibers may be utilized to increase the strength of the mat product. For example, a mixture of polypropylene fibers and polyester fibers could be utilized to increase the strength of the mat product. Due to the higher melting temperature of polyester fibers, these fibers would entangle with the wood fibers and the polypropylene fibers but would not melt. Only the polypropylene fibers would melt and bond with the wood and polyester fibers. Also, polyethylene could be utilized as the melting fiber while polypropylene could be included as the non-melting fiber, in a different embodiment. The preferred product weights are 60 pounds and 90 pounds per 1000 square feet of mat, made up of varying percentages of the wood fibers and the thermoplastic fiber material. For example, one embodiment could consist of 85% wood fiber and 15% polypropylene, while a second embodiment could consist of 80% wood fiber, 10% polypropylene fiber and 10% polyester fiber. In these examples, these percentages would remain constant across the spectrum of product weight. In the preferred embodiment the synthetic fibers are comprised of fibers ranging from ¼ inch to 3 inches in length and from 3 to 6 denier (fiber diameter). Of course, fiber length and denier may be changed to alter the mat strength and/or mat porosity, as desired. In the preferred embodiment, the size and distribution of the wood fibers are controlled by a Ro Tap® Classifier utilizing ASTM screens. The wood fiber portion of the mat is 45% to 56% composed of fibers from an 8 mesh screen; 14–18% fibers from a 16 mesh screen; 10–15% fibers from a 50 mesh screen, and 5–10% fibers from a 100 mesh screen. As will be explained more fully below, varying the percentages of the wood and thermoplastic fibers produce products with different cost and performance characteristics. It should also be understood that the product weights of 60 and 90 pounds/1000 square feet are merely preferred and could be varied as desired.

The wood fibers utilized in the preferred embodiment are processed using a method similar to that disclosed in U.S. Pat. No. 2,757,150, the contents of which are hereby incorporated by reference, in which wood chips are fed to a pressurized steam vessel which softens the chips. Any type of wood chip may be used, but wood chips of the soft hardwood variety, such as yellow poplars are preferred. A defiberator mechanically separates and sizes the chips into individual fiber bundles. The use of thermo-mechanical wood fibers yields several advantages over prior art mats. First, the wood fibers are highly hygroscopic in nature and allow the erosion mat to absorb moisture immediately upon contact with water. This results in reduced water run-off on a project site which improves percolation into the soil surface and minimizes erosion as well as improving seed germination and growth by increasing the amount of water available for plants. Secondly, thermo-mechanical wood fibers are of a finer denier than prior art mats. Also, the wood fibers are shorter in length. This allows for a more supple mat product and also for the formation of a more uniform mat in both thickness and density. When the mat product is wet, it conforms much better to the irregular terrain which eliminates the gap between the bottom surface of the mat and the soil. The ability to conform to the terrain acts to trap the soil and seed bed which results in much less sediment and seed bed loss. Once the mat product is dry, the erosion mat retains its new shape with virtually no recovery. Thirdly, the wood fibers tend to entangle with the thermoplastic fibers within the mat substrate. This adds to the mat's strength in all directions, thereby improving the handability of the product without requiring netting on one or both sides as required by prior art mats. Of course netting may be added to one or both sides of the mat product for maximum strength.

The polypropylene fiber is the preferred thermoplastic fiber used that is melted and flows under pressure to create the bonding medium, discussed below in connection with the embosser. When two or more types of thermoplastic fibers are utilized, the second type of fiber is chosen such that it has a melting temperature higher than Polypropylene. For example, polypropylene melts at a lower temperature than polyester. The temperature of the embosser is maintained such that the polypropylene melts in the areas under pressure, if polypropylene alone is used, or if polyester is also added, the polyester remains unmelted. The unmelted polyester fibers further entangle the wood fibers, improving fiber length, adding strength to the mat and bond with the melted polypropylene fibers. While polypropylene and polyester fibers are preferred, it should be understood that any two thermoplastic products with different melting temperatures could be used.

Referring now to FIG. 1, the assembly line which produces the inventive mat is shown generally at 10. Reference numerals 12, 14, and 16 respectively refer to weigh cells and mixing devices which weigh and mix together predetermined amounts of thermo-mechanically processed wood fibers, polypropylene fibers, and polyester fibers which form one embodiment of the inventive mat. Weigh cells and mixing devices are well known in the prior art. The material is conveyed to a blender called a Pre Carder, shown at 18, which more thoroughly mixes together the three fiber materials. The blended material is then blown to the Rando® Feeder 20 which feds the material to the Rando® Webber 22 which is a vacuum high speed former. The Rando® Webber lays the mat on a moving conveyer in an air-lay process, as is well known in the art. The function and use of mixing devices, Pre Carders and Rando® Feeders and Webbers are well known in the art. The material is next conveyed to the embosser 24 to be thermally bonded and densified (more fully discussed below). The bonded mat product is then conveyed to slitter station 26, trimmed, slit if required, and cut-off at predetermined lengths, rolled and packaged for shipment at winder station 28. Slitters and winders are well known in the art.

The embossing station 24 is comprised of two embossing rolls having a nominal 24 inch diameter and 110 inch width in the preferred embodiment. These embossing rolls produce a 96 inch wide mat product. By varying the dimensions of the embossing rolls any width mat product desired can be produced. One or both of the embossing rolls may have an engraved pattern approximately 0.125 inches deep in its surface. In the preferred embodiment the embossing rolls are approximately 0.005 inches apart, although this gap may be varied to accommodate any desired thickness of mat product. In the preferred embodiment, one embossing roll contains the pattern thereby bonding the mat product in the predetermined pattern on one side only, however affecting the bond throughout the thickness of the mat in the areas of the raised portion of the pattern. Because the bond extends throughout the thickness of the mat in the pattern area, the mat is held together, thereby preventing delamination of the mat product and improving mat tensile strength. Additionally, the temperature of each embossing roll may be independently adjusted to affect the end product. For example, in the preferred embodiment the top embossing roll (the one with the pattern) is maintained at a temperature of up to 450° F. while the lower embossing roll (no pattern) is maintained at a relatively lower temperature of up to 400° F. It has been found experimentally that the combination of two heated rolls applying pressure to the mat product raise the temperature of the mat such that as the pattern presses into the product it results in bonding only in the desired pattern. By adjusting the temperature of the lower roll it is possible to entirely bond on the lower side of the mat product, if desired. Other factors which might be altered to achieve the desired product are: temperature of the embossing rolls; the type of thermoplastic fiber used, the fiber size, in both length and denier; the diameter of the embossing roll (which affects the dwell time of the heated roll on the mat product); the line speed; the pattern used, and the pressure applied to the mat product.

Figure 2:
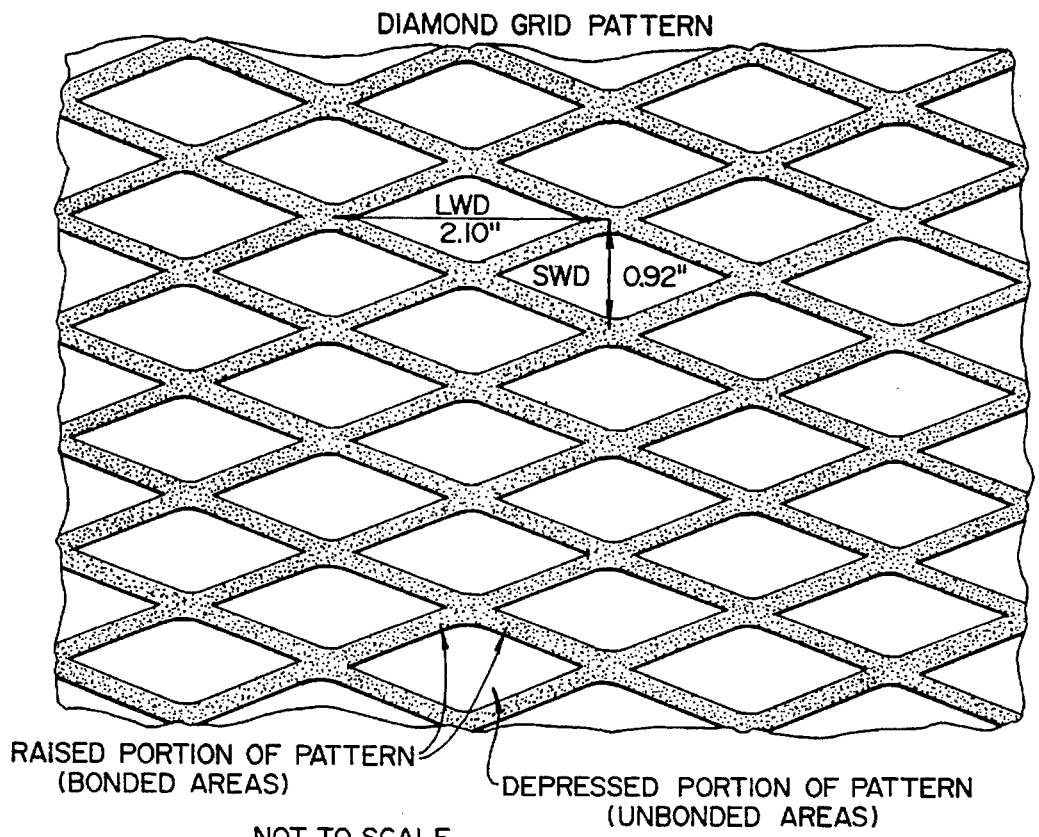
FIG. 2 is a schematic of the preferred thermobonding embossing pattern.

The pattern utilized in the preferred embodiment is shown in FIG. 2. The pattern consists of a diamond grid pattern with each diamond measuring 2.1 inches in the long dimension and 0.92 inches in the other dimension. In the preferred embodiment the short dimension runs in the machine direction. The temperature of the surface of the embossing roll, including the grid pattern of FIG. 2 is maintained above the melting point of polypropylene. In the preferred embodiment the top embossing roll is heated up to 450° F. and the lower embossing roll is heated up to 400° F., although altering any of the factors mentioned above might necessitate slightly different temperatures to the embossing rolls to achieve the desired mat product. As the embossing rolls press the raised pattern of FIG. 2 into the mat product, the polypropylene fibers (which are entangled with wood fibers) melt and flow at the points contacted by the raised pattern. This is caused by the additional pressure on the mat product at these contact points. It should be understood that not all the polypropylene in the mat melts, only the polypropylene contacting the pattern of FIG. 2. The grid pattern of FIG. 2 is designed to provide sufficient tensile strength for handability while also providing open area (unbonded mat) to allow germinating seeds to emerge through the mat product. The particular pattern shown in FIG. 2 provides an optimum balance between the strength of the mat product, which affects the handability of the product, and the open area in the mat product. The pattern of FIG. 2 allows approximately 55–80% of the mat product to be unbonded or open, depending on the bond width. It should be understood that other patterns could be utilized as well. It should also be understood that if desired the entire surface of one or both sides of the mat could be bonded by providing a smooth embossing roll(s).

Figure 3:
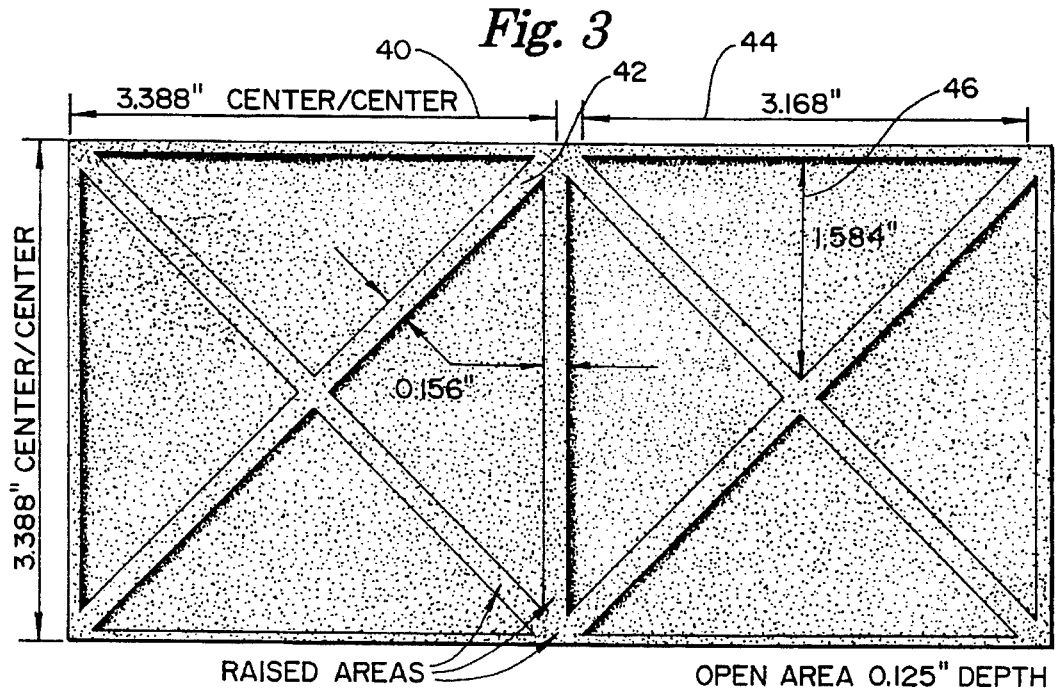
FIG. 3 is a schematic of an alternate thermobonding embossing pattern.

An alternate pattern is shown in FIG. 3. The pattern consists of a square grid pattern with each square being 3.388 inches from center to center (shown at 40), and each square being including an "X" shaped pair of intersecting lines that divide the square into four equal triangles. The intersecting lines making up the "X" shape are 0.156 inches thick (shown at 42). The distance from the inside edge to inside edge is 3.168 inches (shown at 44) and the distance from any edge to the middle point of the square is 1.584 inches (shown at 46). The raised portions are raised approximately 0.125 inches above the rest of the grid. This pattern allows approximately 87% of the mat product to be unbonded or open. By altering the pattern, any desired percentage of open area may be provided for.

The mat product is conveyed to the embossing station, which applies up to approximately 3000 pounds per linear inch of pressure across the mat product via the embossing rolls, in the preferred embodiment. It has been found experimentally that a pressure of between 500–1000 pounds per linear inch provides adequate pressure, and this is the preferred range. The conveyer belt moves anywhere from 40 to 70 feet/minute, in the preferred embodiment. The embossing rolls are maintained at a temperature from between 300° F. to 450° F., with the preferred temperature for the top roll being 450° F. and for the bottom roll up to 400° F. It should be understood that the speed of the line, the temperature of the embossing rolls, the diameter of the embossing rolls, and the pressure applied to the mat product could be changed to accommodate products of vary thickness and/or line speeds. The temperature of the embossing rolls are maintained above the melting temperature of polypropylene. As the mat product is compressed by the embossing rolls, densifying it, the combination of nip pressure and roll temperature causes the polypropylene to melt and flow, thereby creating the bonding in the pattern of FIG. 2. If a second type of thermoplastic material such as polyester is added, the material is chosen such that it does not melt, but is further entangled with the wood fibers and bonds with the melted polypropylene. If the speed of the line were to exceed approximately 70 feet/minute, it may be necessary to preheat the mat product and/or increase the heat of the embossing rolls. Preheating by infrared, hot-air impingement, through the mat heating, or any combination of these are well known in the art, and this modification is considered routine engineering.

The grid shaped pattern on the surface of the embossing rolls can be formed using either electrical discharge machining, etching, conventional machining or engraving. Another embodiment would utilize a series of sleeves which would contain the pattern and which would be slipped over a smooth roll and anchored to it.

Figure 4:
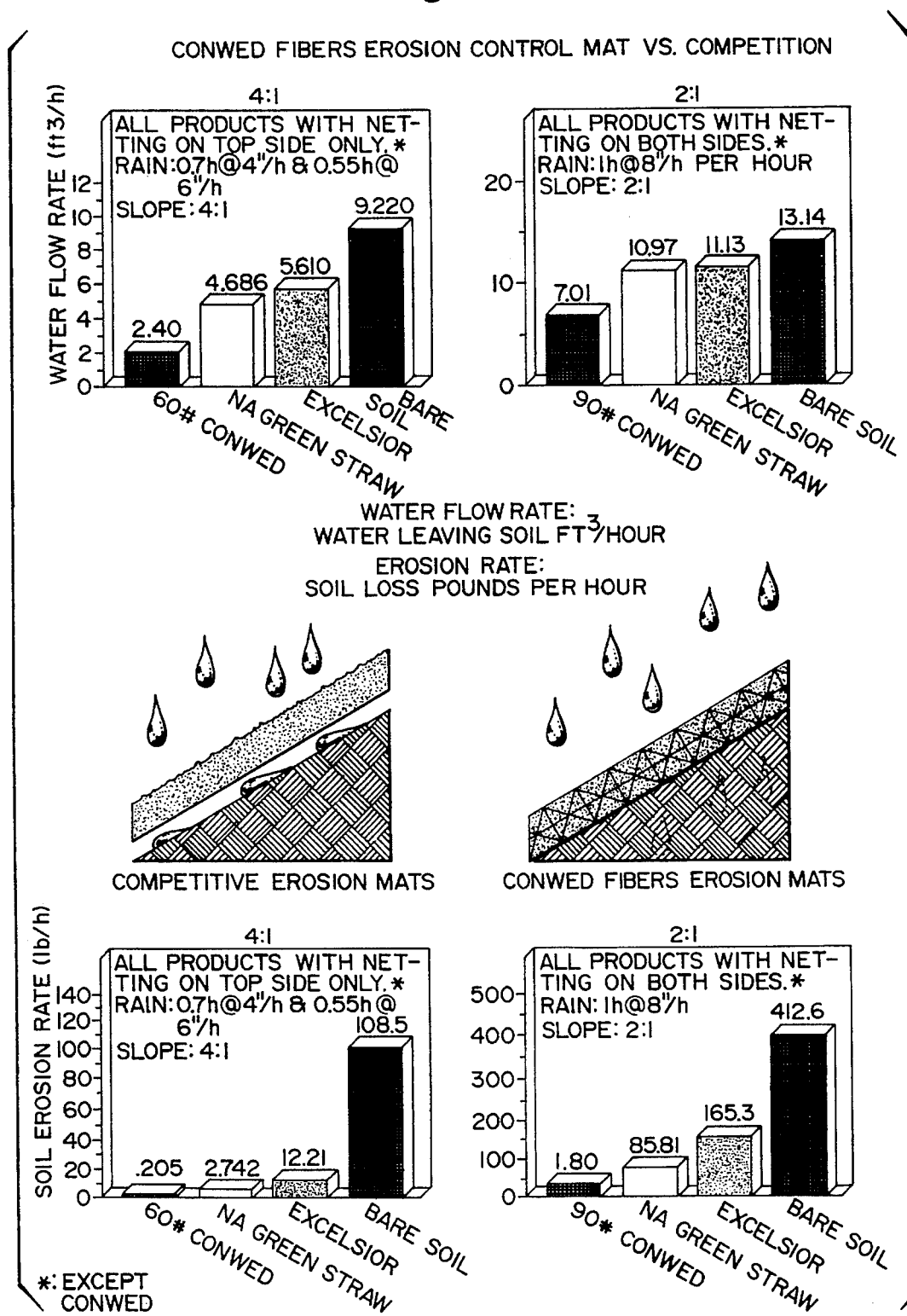
FIG. 4 is a graphic comparing the inventive mat with prior art devices and a schematic of the inventive mat used as an erosion control device.

Referring now to FIG. 4, an erosion control blanket or mat according to the invention is shown at 50 laying over a seed bed 52 on top of an incline of soil 54. Prior art mats do not conform as well to the terrain, as shown by the Figure. Therefore, when water exceeds the soil's ability to absorb it, it runs on top of the soil and underneath the mat, carrying the seed bed with it. On the other hand, the inventive mat 50 is shown laying over the seed bed 52 on top of an incline of soil 54 in better surface conformance. The inventive mat 50 conforms to the terrain more intimately and thereby substantially eliminates the gaps which exist between the soil surface and the prior art mats. The mat absorbs the kinetic energy of the raindrop and absorbs the moisture, which slows the rate or infiltration. This allows the water to be gradually absorbed by the soil 54 rather than flow overland washing the seed bed 52 away. In addition, as the improved wood fiber arrangement in mat 50 absorbs water, the fibers in the mat conform to the terrain and become an integral part of the soil surface. This prevents the washing away of the seed bed and prevents the loss of sediment or soil. The benefit this provides is reduced erosion and a more uniform stand of vegetation compared to prior art mat products.

EXAMPLE 1

One form of the product would be comprised of 85% wood fibers and 15% polypropylene fibers. This product combines good handling and strength with a fairly inexpensive price point due to the percentages of thermoplastic material. This embodiment could be utilized in a wide variety of situations.

EXAMPLE 2

To provide more strength another form of the product would be comprised of 80% wood fibers, 10% polypropylene and 10% polyester. This product also combines good handling and strength with a fairly inexpensive price point due to the percentages of thermoplastic material. This embodiment could be utilized in a wide variety of situations.

EXAMPLE 3

For situations requiring maximum product strength, the product could be formed of 60% wood fibers, 20% polypropylene and 20% polyester. This product is more expensive due to the higher percentage of thermoplastic material, but is also much stronger than that formed by example one. This embodiment would be utilized on very steep slopes or embankments.

EXAMPLE 4

For situations where minimal strength is required, the product could be formed of 90% wood fibers, 5% polypropylene and 5% polyester. One example of an appropriate use for such a product is as winter cover for golf greens.

EXAMPLE 5

The mat product could be used as packaging material if comprised of 94% wood fibers and 6% polypropylene fibers. In addition to the embossing to bond the mat to prevent delamination, the mat product could also be run through a calendaring station which would glaze the entire surface of both sides of the mat product. In this application it would not matter that glazing the entire surface severely degrades the absorption capability of the wood fibers in the mat. This product would be inexpensive to manufacture.

The embodiments of examples 1–5 could also be produced with netting on one or both sides to increase product strength, if desired. It is important to note that prior art mat products required netting simply to hold the product together. Applicants' mat product can be produced without netting, or for maximum strength, with netting on one or both sides. Applicants' have discovered that surprisingly, when polypropylene netting is applied over the mat product prior to running it through the embossing rolls, it is possible to run the mat/netting product through the rolls without causing unacceptable loss of tensile strength due to thermal degradation. The netting is not in contact with the heated embossing roll long enough to cause the entire netting to melt, thereby losing its strength. The netting melts only in the weld area and is pressed into the wood product, bonding with the melted polypropylene fibers, securing the netting to the mat product. Prior art mats have had to stitch bond, adhesively bond or use a hot melt to attach the netting required to hold the product together.

Table 1 shows data regarding the performance characteristics of prior art types of netting products. Table 2 shows data regarding the performance of applicants' inventive netting products.

FIG. 4 shows several graphs of the inventive mat product compared with prior art devices.

TABLE 1

| Test | Plot | Product | Test Conditions | Soil Weight (lb) | Water Volume (ft³) | Collection Time (h) | Soil Erosion Rate (lb/h) | Water Flow Rate (ft³/h) |
|---|---|---|---|---|---|---|---|---|
| 1 | 1 | NAGreen straw 1† | T1* | 4.440 | N/A*** | 1.133 | 3.919 | N/A*** |
| 1 | 3 | Excelsior 1 | T1* | 7.590 | N/A*** | 1.133 | 6.699 | N/A*** |
| 1 | 4 | Excelsior 2 | T2** | 70.50 | N/A*** | 0.519 | 135.800 | N/A*** |
| 1 | 6 | NAGreen straw 2 | T2** | 91.30 | N/A*** | 0.674 | 135.50 | N/A*** |
| 2 | 2 | Excelsior 1 | T1* | 14.98 | 5.850 | 1.033 | 14.50 | 5.663 |
| 2 | 3 | NAGreen straw 1 | T1* | 1.990 | 4.740 | 1.033 | 1.926 | 4.589 |
| 2 | 4 | NAGreen straw 1 | T1* | 2.460 | 4.940 | 1.033 | 2.381 | 4.782 |
| 2 | 5 | Excelsior 1 | T1* | 15.94 | 5.740 | 1.033 | 15.430 | 5.557 |
| 3 | 1 | Excelsior 2 | T2** | 87.00 | 5.190 | 0.433 | 200.7 | 11.978 |
| 3 | 2 | NAGreen straw 2 | T2** | 29.00 | 5.620 | 0.450 | 64.44 | 12.489 |
| 3 | 5 | NAGreen straw 2 | T2** | 28.25 | 4.650 | 0.492 | 56.45 | 9.458 |
| 3 | 6 | Excelsior 2 | T2** | 79.75 | 5.150 | 0.500 | 159.5 | 10.300 |
| 4 | 1 | Bare soil | T2** | 70.00 | 2.340 | 0.244 | 286.8 | 9.590 |
| 4 | 2 | Bare soil | T1* | 54.50 | 4.460 | 0.500 | 109.0 | 8.920 |
| 4 | 3 | Bare soil | T2** | 81.50 | 2.910 | 0.242 | 337.3 | 12.045 |
| 4 | 4 | Bare soil | T1* | 54.00 | 4.760 | 0.500 | 108.0 | 9.520 |
| 4 | 6 | Bare soil | T2** | 112.5 | 3.630 | 0.183 | 613.7 | 19.804 |
| 5 | 1 | Excelsior 2 | T2** | N/A**** | N/A**** | N/A**** | N/A**** | N/A**** |
| 5 | 2 | NAGreen straw 2 | T2** | N/A**** | N/A**** | N/A**** | N/A**** | N/A**** |
| 5 | 5 | NAGreen straw 2 | T2** | N/A**** | N/A**** | N/A**** | N/A**** | N/A**** |
| 5 | 6 | Excelsior 2 | T2** | N/A**** | N/A**** | N/A**** | N/A**** | N/A**** |

†1: netting top side only
††2: netting on both sides
*T1: rain: 0.7 h @ 4"/h and 0.55 h @ 6:/h; slope: 4:1
**T2: rain: 1.0 h @ 8"/hr; slope: 2:1
***No water volume data were recorded in test No. 1
****Slope failure in all plots; no data were collected Table 2 shows a comparison of 60 and 90 pound Conwed mat product without netting compared to bare soil. The 60# product was tested on a 4:1 slope at 4 inches per hour for approximately 42 minutes, and 6 inches per hour until the end of the test. The 90# product was tested on a 2:1 slope with rain applied at a rate of 8 inches per hour for 40 minutes. Both products are comprised of 80% wood fibers, 10% polypropylene fibers and 10% polyester fibers.

TABLE 2

| Plot | Product | Collection Time (hr) | Water Volume (cu. ft.) | Soil Weight (lb.) | Water Runoff Rate (cu. ft/hr.) | Soil Erosion Rate (lb/hr.) |
|---|---|---|---|---|---|---|
| 1 | 60# CONWED mat | 1.217 | 2.34 | 0.30 | 1.92 | 0.25 |
| 2 | 60# CONWED mat | 1.217 | 3.51 | 0.20 | 2.88 | 0.16 |
| 3 | Bare soil control 1 | 1.217 | 8.19 | 51.20 | 6.73 | 42.08 |
| 4 | 90# CONWED mat | 0.633 | n/a | n/a | n/a | n/a |
| 5 | 90# CONWED mat | 0.667 | 4.67 | 1.20 | 7.01 | 1.80 |

TABLE 2-continued

| Plot | Product | Collection Time (hr) | Water Volume (cu. ft.) | Soil Weight (lb.) | Water Runoff Rate (cu. ft/hr.) | Soil Erosion Rate (lb/hr.) |
|---|---|---|---|---|---|---|
| 6 | Bare soil control 2 | 0.667 | 14.78 | 156.20 | 22.17 | 234.30 |

Figure 5:
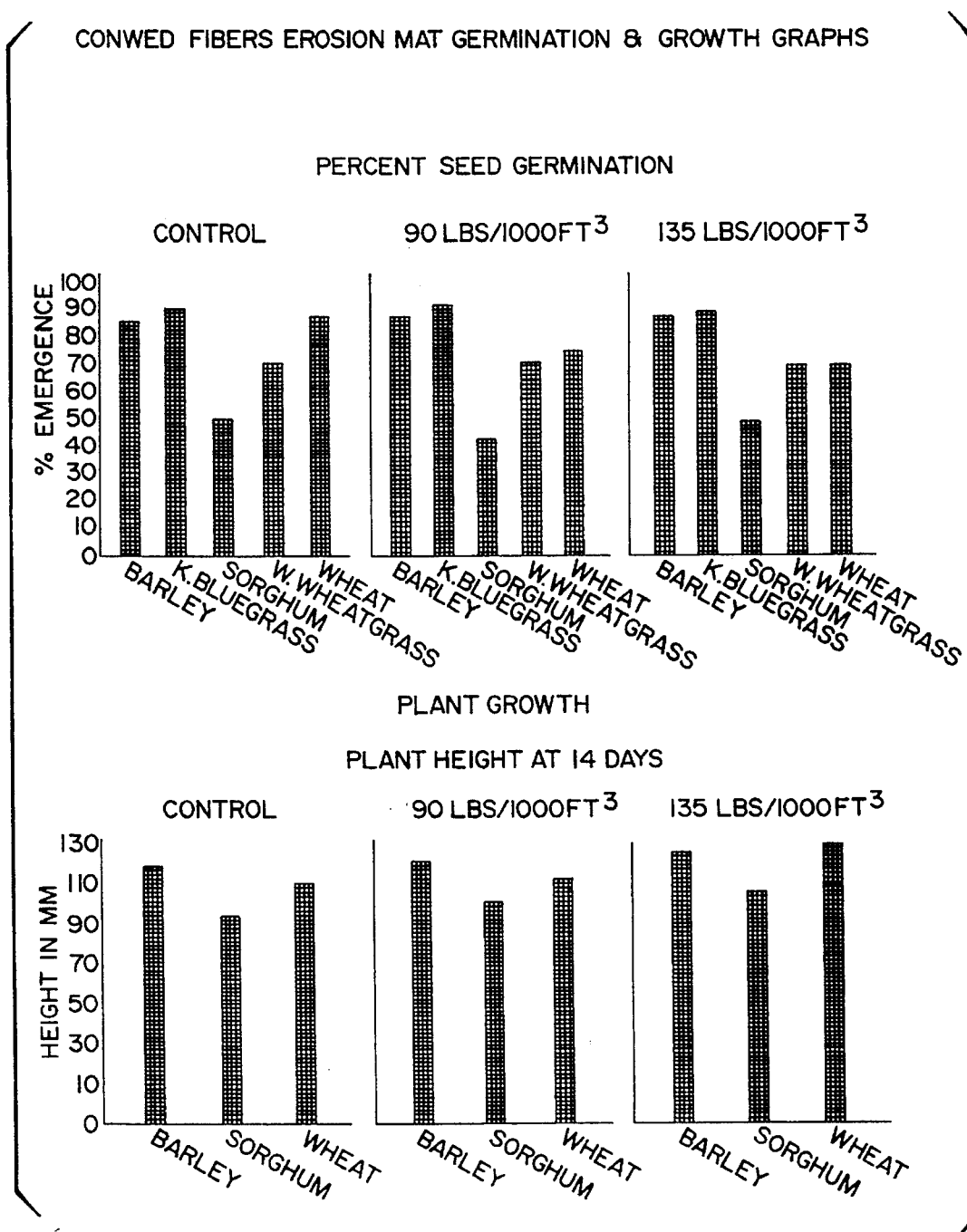
FIG. 5 is a graphic showing the effects of the inventive mat product on germination.

Finally FIG. 5 shows a graph which shows that the mat products do not have a negative effect on germination.

As the data in Tables 1 and 2 shows, the Conwed product provides much better erosion control while allowing not adversely affecting germination.

This completes the description of the preferred and alternate embodiments of the invention. Those skilled in the art may recognize other equivalents to the specific embodiment described herein which equivalents are intended to be encompassed by the claims attached hereto.

What is claimed is:

1. A process for manufacturing a mat comprising the steps of:

weighing and mixing together predetermined quantities of wood fibers and a thermoplastic fiber material having a melting temperature below 400° F., the wood fibers diameter being determined by a mesh screen, the wood fiber diameter ranging in size by using mesh screens between 8 mesh and 100 mesh, and the wood and thermoplastic fibers being sized to allow the mat to become an integral part of the soil surface;

blending the fibers together, the mixed blend of wood and thermoplastic fibers entangling to form a mat which has a porosity which permits vegetation to grow through the mat;

laying the mixture of fibers onto a moving conveyor;

bonding selected areas of the mat using a pair of embossing rolls, the embossing rolls being heated such that the compression caused by the embossing rolls causes the thermoplastic material to melt and bond in the selected areas, wherein the unselected areas maintain their porosity to permit vegetation to germinate therethrough.

2. The process of claim 1 wherein the one embossing roll is heated up to approximately 450° F. and the other embossing roll is heated up to approximately 400° F.

3. The process of claim 2 wherein the pressure applied to the mat is between 500 and 100 pounds per linear inch.

4. The process of claim 1 further including the steps of:

cutting the mat into predetermined lengths, and rolling and packaging the mat for shipment.

5. The process of claim 1 further including the steps of:

adding a layer of netting to one or both sides of the mat prior to the step of embossing;

cutting the mat at predetermined lengths, and rolling and packaging the mat for shipment.

6. The process of claim 1 wherein the conveyor moves at between 40 and 70 feet per minute.

7. The process of claim 1 wherein the selected areas are comprised of a grid of squares formed of bonded material, with each square containing an "X" shaped pair of lines formed of bonded material, the ends of the lines bisecting the four corners of the square.

8. The process of claim 1 wherein the selected areas are comprised of a grid of diamond like areas of bonded material.

9. The process of claim 1 further including the step of running the mat product through a calendaring station to glaze seal the surface of both sides of the mat product.

* * * * *